(12) United States Patent
Yeom et al.

(10) Patent No.: US 9,657,595 B2
(45) Date of Patent: May 23, 2017

(54) BEARING UNIT OF TURBO-CHARGER

(71) Applicant: Hyundai Motor Company, Seoul (KR)

(72) Inventors: Kitae Yeom, Seoul (KR); Jaesik Yang, Seoul (KR); Sung Won Kim, Hwaseong-si (KR); Tae Won Hwang, Seoul (KR); Hong-Young Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 542 days.

(21) Appl. No.: 14/099,245

(22) Filed: Dec. 6, 2013

(65) Prior Publication Data
US 2014/0186159 A1 Jul. 3, 2014

(30) Foreign Application Priority Data

Dec. 31, 2012 (KR) ........................ 10-2012-0158628

(51) Int. Cl.
| F01D 25/16 | (2006.01) |
|---|---|
| F01D 25/18 | (2006.01) |
| F16C 33/10 | (2006.01) |
| F16C 17/04 | (2006.01) |

(52) U.S. Cl.
CPC .......... *F01D 25/18* (2013.01); *F16C 33/1025* (2013.01); *F01D 25/16* (2013.01); *F01D 25/168* (2013.01); *F05D 2220/40* (2013.01); *F05D 2240/52* (2013.01); *F05D 2260/609* (2013.01); *F16C 17/04* (2013.01); *F16C 2360/24* (2013.01)

(58) Field of Classification Search
CPC ...... F01D 25/16; F01D 25/166; F01D 25/168; F01D 25/18; F01D 25/20; F01D 25/125; F05D 2260/609; F05D 2220/40; F05D 2240/50; F05D 2240/52; F05D 2240/53; F05D 2240/70; F16C 2360/24; F16C 17/04
USPC ........ 415/104, 105, 109, 111, 112, 175, 180, 415/229–231; 60/605.3; 417/407, 417/423.11, 423.13
See application file for complete search history.

(56) References Cited

U.S. PATENT DOCUMENTS

| 4,392,752 A | * | 7/1983 | Shimizu | .................. | F01D 11/00 |
|---|---|---|---|---|---|
| | | | | | 384/135 |
| 5,857,332 A | * | 1/1999 | Johnston | ............... | F01D 25/168 |
| | | | | | 417/407 |
| 6,126,414 A | * | 10/2000 | Koike | .................. | F01D 25/168 |
| | | | | | 384/105 |

(Continued)

FOREIGN PATENT DOCUMENTS

| CN | 1201105 A | 12/1998 |
|---|---|---|
| CN | 102066715 A | 5/2011 |

(Continued)

*Primary Examiner* — Christopher Verdier
(74) *Attorney, Agent, or Firm* — Morgan Lewis & Bockius LLP

(57) ABSTRACT

A bearing unit of a turbocharger may be disposed on an inner side of a space in a center housing and carry axial load of a rotary shaft connecting a turbine wheel, a compressor wheel, and an electric motor. The bearing unit may include a bearing body fastened to a side of the center housing and has a through-hole substantially at a center of the bearing body, and a coupling disposed in the through-hole and on the rotary shaft, having a stepped portion in which the bearing body is inserted, and forming an oil chamber with the bearing body.

4 Claims, 2 Drawing Sheets

(56) References Cited

U.S. PATENT DOCUMENTS

2010/0310366 A1* 12/2010 Eguchi .................. F01D 25/168
415/229

FOREIGN PATENT DOCUMENTS

| KR | 20100117060 A | 11/2010 | |
|----|----|----|----|
| WO | WO-2010/002717 A2 * | 1/2010 | ............. F01D 25/16 |
| WO | WO 2010/020341 A1 | 2/2010 | |

* cited by examiner

BEARING UNIT OF TURBO-CHARGER

CROSS-REFERENCE TO RELATED APPLICATION

The present application claims priority of Korean Patent Application Number 10-2012-0158628 filed Dec. 31, 2012, the entire contents of which application are incorporated herein for all purposes by this reference.

BACKGROUND OF INVENTION

Field of Invention

The present invention relates to a bearing unit of a turbocharger. More particularly, the present invention relates to a bearing unit of a turbocharger which prevents a lubricant from leaking to an electric motor while carrying axial load of a rotary shaft in a center housing of an electric turbocharger.

Description of Related Art

In general, a turbocharger is a device that turns a turbine using exhaust gas from an engine and then increases the output of the engine by supplying high-pressure air into a combustion chamber, by operating the compressor using the torque of the turbine.

Electric turbochargers, which can operate a rotary shaft of the turbochargers with an electric motor, thus operating a compressor with the electric motor at low-speed and operating the compressor by using torque of a turbine turned by exhaust gas at high-speed, are used in recent years.

In the electric turbochargers, high-temperature heat is generated by high-speed rotation of the electric motor, the compressor wheel, the turbine wheel, and the rotary shaft, and they are cooled by a lubricant for cooling and lubricating.

In particular, the rotary shaft is cooled by the lubricant supplied into the center housing and a sealing bracket is disposed at a space at a side in the center housing where the electric motor is disposed, such that the lubricant is prevented from leaking to the electric motor.

Further, a thrust bearing carrying axial load of the rotary shaft and an oil deflector guiding the flow of the lubricant are disposed between the sealing bracket and the center housing.

However, since the sealing bracket, the thrust bearing, and the oil deflector are disposed in a line on the rotary shaft, the rotary shaft needs to be long, and accordingly, the entire length of the turbochargers is long.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a bearing unit of a turbocharger having advantages of carrying axial load of a rotary shaft, on a side of a space in a center housing of an electric turbocharger and of preventing a lubricant from leaking to the electric motor while cooling and lubricating the rotary shaft with the lubricant through an oil inlet and an oil outlet.

Further, the present invention provides a bearing unit of a turbocharger having advantages of being able to reduce the length of a rotary shaft, thus reducing the entire length or size of the turbocharger, by removing a sealing bracket and an oil deflector.

Various aspects of the present invention provide a bearing unit of a turbocharger that is disposed on the inner side of a space in a center housing and carries axial load of a rotary shaft connecting a turbine wheel, a compressor wheel, and an electric motor. The bearing unit may include a bearing body fastened to a side of the center housing and has a through-hole substantially at a center of the bearing body with the rotary shaft fitted therein, and a coupling disposed in the through-hole and on the rotary shaft, having a stepped portion in which the bearing body is inserted, and forming an oil chamber with the bearing body.

The bearing unit may further include an oil supply channel formed in the center housing, an oil inlet extending to an inner side of the through-hole facing the oil chamber from above the bearing body and in fluid communication with the oil supply channel, an oil discharge channel formed in the center housing, and an oil outlet formed below the center of the bearing body for discharging a lubricant in the oil chamber through the oil discharge channel.

The oil outlet may be a groove formed by formed by cutting off a portion of the bearing body from below the center of the bearing body and connected with the through-hole. The lower portion of the groove may be an inclined surface facing the oil discharge channel.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
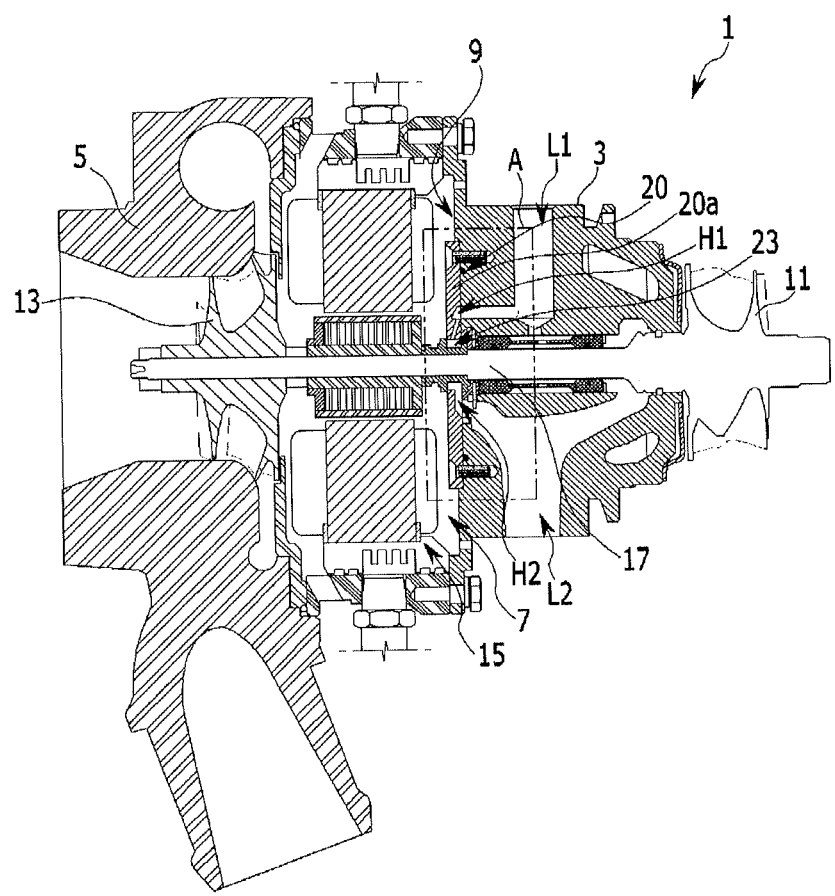
FIG. 1 is a partial cross-sectional view of an exemplary turbocharger equipped with a bearing unit according to the present invention.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The sizes and thicknesses of the configurations shown in the drawings are provided selectively for the convenience of description, such that the present invention is not limited to those shown in the drawings and the thicknesses are exaggerated to make some parts and regions clear. Further, parts that are not related to the description are not drawn to make exemplary embodiments of the present invention clear.

Figure 2:
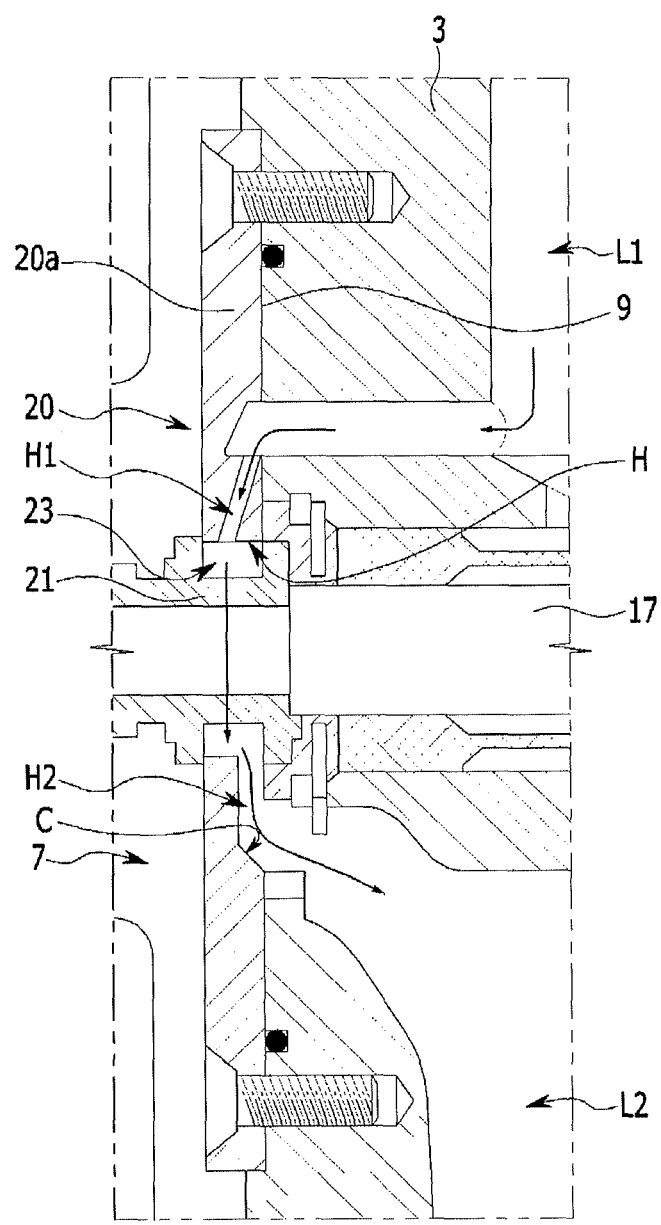
FIG. 2 is an enlarged view of the part A in FIG. 1.

FIG. 1 is a partial cross-sectional view of a turbocharger equipped with a bearing unit according to various embodiments of the present invention and FIG. 2 is an enlarged view of the part A in FIG. 1.

Referring to FIGS. 1 and 2, an electric turbocharger 1 is exemplified in the following description, as a turbocharger to be equipped with a bearing unit according to various embodiments of the present invention. That is, the electric turbocharger 1 includes a turbine wheel 11 disposed in a turbine housing at a side of a center housing 3 and a compressor wheel 13 disposed in a compressor housing 5 at the other side.

An electric motor 15 is disposed in a space 7 defined in the center housing 3, and the turbine wheel 11, the compressor wheel 13 and the electric motor 15 are connected by one rotary shaft 17.

A bearing unit 20 according to various embodiments of the present invention, which is used in the electric turbocharger 1, is a thrust bearing and carries axial load of the rotary shaft 17. The bearing unit 20 includes a bearing body 20a fastened to a side 9 of the center housing 3, for example by bolts, in the space 7 of the center housing 3 and an oil inlet H1 and an oil outlet H2 are formed in the bearing body 20a.

The bearing body 20a has a through-hole H substantially at the center. The bearing unit 20 includes a coupling 21 disposed between the through-hole H and the rotary shaft 17 and an oil chamber 23 is formed between the coupling 21 and the through-hole H. That is, the bearing body 20a is inserted into the stepped portion of the coupling 21 and supports the axial load of the rotary shaft 17 while the oil chamber 23 is formed between the coupling 21 and the bearing body 20a, that is, at the stepped portion.

The oil inlet H1 and the oil outlet H2 are formed above and below the through-hole H, respectively, in the bearing body 20a. The oil inlet H1 communicates with an oil supply channel L1 formed in the center housing 3, extending to the inner side of the through-hole H facing the oil chamber 23 from above the center of the bearing body 20a. The oil outlet H2 communicates with an oil discharge channel L2 formed in the center housing 3, under the center of the bearing body 20a, and discharges lubricant in the oil chamber 23.

In various embodiments, the oil outlet H2 is a groove formed by cutting off a portion from under or below the center of the bearing body 20a to be connected with the through-hole H and the lower portion of the groove is an inclined surface C facing the oil discharge channel L2.

That is, the lubricant supplied from the oil supply channel L1 in the center housing 3 is supplied to the oil chamber 23 formed by the bearing body 20a and the coupling 21 through the oil inlet H1, while the lubricant in the oil chamber 23 is discharged to the oil discharge channel L2 in the center housing 3 through the oil outlet H2 at the lower portion of the bearing body 20a.

Therefore, the lubricant is discharged directly out of the oil chamber 23 without leaking to the electric motor 15 while cooling and lubricating the rotary shaft 17 in the oil chamber 23. As a result, the bearing unit 20 according to various embodiments of the present invention performs both of the function of an oil deflector and the basic function of a thrust bearing by itself while preventing the lubricant from leaking to the space 7 of the center housing 3 where the electric motor 15 is disposed.

Therefore, it is possible to remove a sealing bracket and an oil deflector, which were used in the electric turbocharger 1 of the related art, such that it is possible to reduce the entire length of an electric turbocharger by decreasing the length of the rotary shaft 17.

For convenience in explanation and accurate definition in the appended claims, the terms "inner" or "outer", "above" or "below", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bearing unit of a turbocharger, wherein the bearing unit is disposed on an inner side of a space in a center housing and carries axial load of a rotary shaft connecting a turbine wheel, a compressor wheel, and an electric motor, the bearing unit comprising:
    a bearing body fastened to a side of the center housing and having a through-hole substantially at a center of the bearing body with the rotary shaft fitted in the bearing body; and
    a coupling disposed in the through-hole and on the rotary shaft, having a stepped portion in which the bearing body is inserted, and forming an oil chamber with the bearing body, wherein the bearing body is inserted in and engaged to the stepped portion of the coupling to form the oil chamber between the coupling and the bearing body such that the oil is not leaked to the electric motor from the oil chamber,
    wherein the bearing body and the coupling are disposed between the electric motor and the center housing, and
    wherein the bearing body has an oil inlet fluidically communicating with an oil supply channel positioned in the center housing and an oil outlet fluidically communicated with an oil discharge channel.

2. The bearing unit of claim 1, further comprising:
    the oil inlet extending to an inner side of the through-hole facing the oil chamber from above the bearing body;
    the oil discharge channel formed in the center housing; and
    the oil outlet formed below the center of the bearing body for discharging a lubricant in the oil chamber through the oil discharge channel.

3. The bearing unit of claim 2, wherein the oil outlet is a groove formed by cutting off a portion of the bearing body from below the center of the bearing body and connected with the through-hole.

4. The bearing unit of claim 3, wherein a lower portion of the groove has an inclined surface facing the oil discharge channel.

* * * * *